United States Patent
Thareja et al.

(10) Patent No.: US 11,682,367 B2
(45) Date of Patent: Jun. 20, 2023

(54) ELECTRONIC DEVICES HAVING LIGHT SENSOR MODULES OVERLAPPED BY DISPLAYS

(71) Applicant: Apple Inc., Cupertino, CA (US)

(72) Inventors: Vrinda Thareja, San Jose, CA (US); Arpit B. Mehta, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/668,231

(22) Filed: Feb. 9, 2022

(65) Prior Publication Data

US 2022/0165234 A1    May 26, 2022

Related U.S. Application Data

(62) Division of application No. 17/001,444, filed on Aug. 24, 2020, now Pat. No. 11,289,051.

(51) Int. Cl.
| | | |
|---|---|---|
| G09G 5/10 | (2006.01) | |
| G02F 1/133 | (2006.01) | |
| G02B 1/11 | (2015.01) | |
| G02B 5/00 | (2006.01) | |
| G02B 5/28 | (2006.01) | |

(52) U.S. Cl.
CPC ............ *G09G 5/10* (2013.01); *G02F 1/13318* (2013.01); *G02B 1/11* (2013.01); *G02B 5/003* (2013.01); *G02B 5/281* (2013.01); *G09G 2320/0626* (2013.01); *G09G 2360/141* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 8,120,652 B2 | 2/2012 | Bechtel et al. | |
| 8,872,093 B2 | 10/2014 | Lee et al. | |
| 9,330,606 B2 | 5/2016 | Barnhoefer et al. | |
| 9,477,263 B2 | 10/2016 | Hotelling et al. | |
| 10,267,677 B1 | 4/2019 | Sarkar et al. | |
| 10,649,086 B2 | 5/2020 | Raring et al. | |
| 10,684,684 B1 | 6/2020 | Simmons | |
| 10,747,263 B2 | 8/2020 | Aurongzeb et al. | |
| 2013/0321477 A1 | 12/2013 | Gandhi et al. | |
| 2016/0054175 A1* | 2/2016 | Jia | G01J 1/0233 250/216 |
| 2018/0080815 A1* | 3/2018 | Nayak | G01J 1/4228 |

(Continued)

*Primary Examiner* — Aneeta Yodichkas

(74) *Attorney, Agent, or Firm* — Treyz Law Group, P.C.; G. Victor Treyz; David K. Cole

(57) ABSTRACT

An electronic device may have a display with an array of pixels configured to display images for a user. The electronic device may have an ambient light sensor for gathering ambient light information. Control circuitry in the electronic device may adjust the brightness level of an image being displayed by the display based on ambient light measurements from the ambient light sensor. The ambient light sensor may be formed from an ambient light sensor module that is aligned with an opening in an opaque masking layer in the display. One or more antireflection layers may be interposed between an inwardly facing surface of the display and an opposing external surface of the ambient light sensor module. The ambient light sensor module may have a light attenuator and other optical structures.

18 Claims, 9 Drawing Sheets

(56) References Cited

U.S. PATENT DOCUMENTS

2018/0373112 A1    12/2018  O'Keeffe
2019/0096364 A1*   3/2019   Lyngnes ................. G09G 5/10
2020/0103613 A1*   4/2020   Shen ................. G02B 27/0012

* cited by examiner

ELECTRONIC DEVICES HAVING LIGHT SENSOR MODULES OVERLAPPED BY DISPLAYS

This application is a division of U.S. patent application Ser. No. 17/001,444, filed Aug. 24, 2020, which is hereby incorporated by reference herein in its entirety.

FIELD

This relates generally to electronic devices, and, more particularly, to electronic devices with light sensors.

BACKGROUND

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate. Color ambient light sensors can detect changes in the color of ambient light so that compensating color cast adjustments can be made to displayed content.

SUMMARY

An electronic device may have a display with an array of pixels forming an active display area. During operation of the device, the array of pixels may be used to display an image for the user. In an inactive border area or other inactive display area that is free of pixels, an opaque masking layer may be included in the display to block internal device components from view from the exterior of the electronic device. Ambient light may pass through an opening in the opaque masking layer.

The electronic device may have an ambient light sensor module aligned with the opening in the opaque masking layer. Control circuitry in the electronic device may adjust a brightness level associated with an image being displayed by the display based on ambient light measurements from the ambient light sensor module.

In some configurations, one or more antireflection layers may be interposed between an inwardly facing surface of the display and an opposing external surface of the ambient light sensor module.

The ambient light sensor module may have a light attenuator and other optical structures. The light attenuator may provide the ambient light sensor module with a dark appearance that matches surrounding portions of the opaque masking layer. If desired, light diffuser structures, infrared-light-blocking structures, light guide structures, and/or other optical structures may be included in the ambient light sensor module.

DETAILED DESCRIPTION

Figure 1:
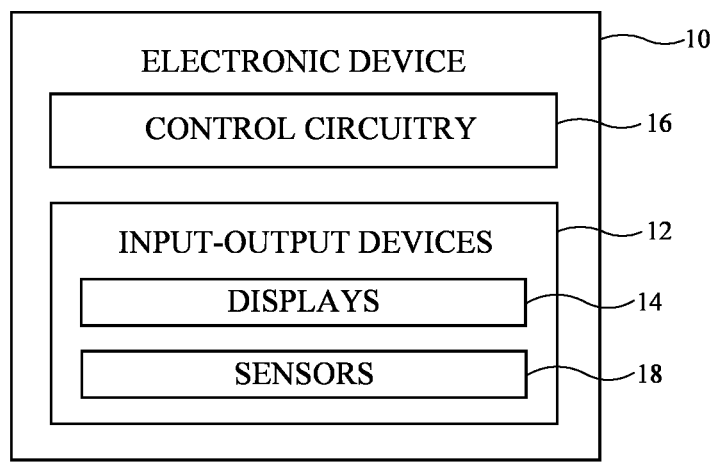
FIG. 1 is a schematic diagram of an illustrative electronic device having an ambient light sensor module in accordance with an embodiment.

An illustrative electronic device of the type that may be provided with one or more optical components such as ambient light sensor modules is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch or other device worn on a user's wrist, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry and wireless local area network communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include a capacitive sensor, a light-based proximity sensor, a magnetic sensor, an accelerometer, a force sensor, a touch sensor, a temperature sensor, a pressure sensor, a compass, a microphone, a radio-frequency sensor, a three-dimensional image sensor, a camera, a light-based position sensor (e.g., a lidar sensor), and other sensors. Sensors 18 may also include one or more light detectors that are configured to detect ambient light. Sensors 18 may, for example, include one or more monochrome ambient light sensors and one or more color ambient light sensors that are configured to measure ambient light from the environment in which device 10 is operated. A monochrome ambient light sensor may be used to measure ambient light intensity. A color ambient light sensor may be used to measure the color (color spectrum, color temperature, color coordinates, etc.) of ambient light and may be used to measure ambient light intensity.

To make color measurements, a color ambient light sensor in device 10 may have a light detector such as a photodiode that is overlapped by a tunable wavelength filter and/or may have multiple channels each of which has a light detector such as a photodiode that is overlapped by a filter that passes a different color of light (e.g., a different wavelength band) to that light detector. Photodetectors such as photodiodes may be formed in a semiconductor die. By processing the readings from each of the multiple channels, the relative intensity of each of the different colors of light can be determined. Using data from the different channels in a color ambient light sensor, control circuitry 16 can therefore produce ambient light color temperature measurements and other color measurements (e.g., colors represented in color coordinates, etc.). The ambient light color information may be used in controlling display 14 and/or in taking other actions in device 10. As an example, the color cast of images displayed on display 14 can be adjusted based on ambient light color measurements (e.g., to make the images on display 14 yellower in warm ambient lighting conditions and to make the images on display 14 bluer in cold ambient lighting conditions). If desired, display brightness may be automatically increased by control circuitry 16 in response to detection of bright ambient light conditions and may be automatically decreased by control circuitry 16 in response to detection of dim ambient light conditions. Adjustments to the brightness of the image on display 14 in this way based on ambient light sensor measurements from an ambient light sensor in device 10 may help enhance user comfort when viewing images.

Electronic device 10 may include one or more ambient light sensors. Illustrative arrangements in which device 10 includes a single ambient light sensor are sometimes described herein as an example. In some configurations, the ambient light sensor may be located directly under or nearly under display 14 (e.g., under an active display area or under an inactive border of a display, in an inactive notch formed along an edge of an active display area, in an inactive island that forms a window area within an active display area, etc.).

Display 14 may be an organic light-emitting diode display, a liquid crystal display, or other display. In some configurations, organic light-emitting diode pixel light emission or backlight unit light emission in a backlit liquid crystal display may be temporarily dimmed to help prevent backlight leakage that could generate stray light. This may help reduce noise during ambient light measurements. Ambient light measurements can also be gathered while a display backlight is active. To help reduce crosstalk while a backlight is active, an ambient light sensor module may be provided with a light attenuator. The light attenuator may attenuate stray light to help reduce stray light noise. The light attenuator may also help provide the ambient light sensor module with a dark outward appearance that matches surrounding opaque masking material that is used in the inactive area of the display. A clear aperture may be formed in an opaque masking layer to allow ambient light to reach the ambient light sensor module.

Figure 2:
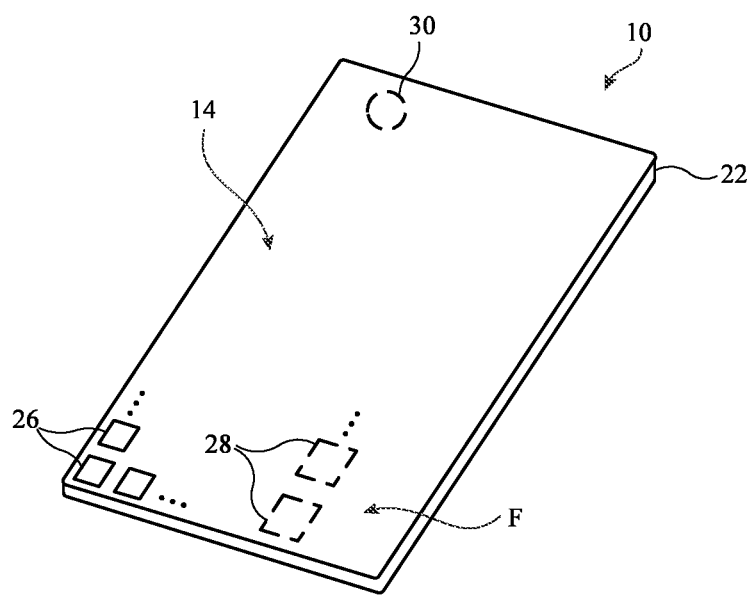
FIGS. 2 and 3 are perspective views of illustrative electronic devices in accordance with embodiments.

A perspective view of an illustrative electronic device of the type that may include an ambient light sensor is shown in FIG. 2. In the example of FIG. 2, device 10 includes a display such as display 14 mounted in housing 22. Display 14 may be a liquid crystal display, a light-emitting diode display such as an organic light-emitting diode display or a display formed from crystalline semiconductor light-emitting diode dies, or other suitable display. Display 14 may have an array of pixels 26 extending across some or all of front face F of device 10 and/or other external device surfaces. The pixel array may be rectangular or may have other suitable shapes. Display 14 may be protected using a display cover layer (e.g., a transparent front housing layer) such as a layer of transparent glass, clear plastic, sapphire, or other clear layer. The display cover layer may overlap the array of pixels 26.

Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 and display 14 may separate an interior region of device 10 from an exterior region surrounding device 10. Housing 22 may be formed using a unibody configuration in which some or all of housing 22 is machined or molded as a single structure or may be formed using multiple structures (e.g., an internal frame structure, one or more structures that form exterior housing surfaces, etc.). If desired, a wristband or other strap may be coupled to a main portion of housing 22 (e.g., in configurations in which device 10 is a wristwatch). Internal electrical components 28 (e.g., integrated circuits, discrete components, etc.) for forming control circuitry 16 and input-output devices 12 may be mounted in the interior of housing 22. In some configurations, components 28 may be attached to display 14 (e.g., display driver circuitry may be mounted to the inner surface of display 14).

Pixels 26 may cover all of the front face of device 10 or display 14 may have inactive areas (e.g., notches, rectangular islands, or other regions) that are free of pixels 26. The inactive areas may be used to accommodate an opening for a speaker and windows for optical components such as image sensors, an ambient light sensor, an optical proximity sensor, a three-dimensional image sensor such as a structured light three-dimensional image sensor, a camera flash, etc. An ambient light sensor may be formed under a window opening in housing 22 (e.g., a sensor may be mounted under a hole in a metal housing wall), may be formed under the active area of display 14, or may be formed under an inactive display area. For example, an ambient light sensor may be formed on front face F along one of the edges of device 10 such as illustrative ambient light sensor region 30 of FIG. 2.

Figure 3:
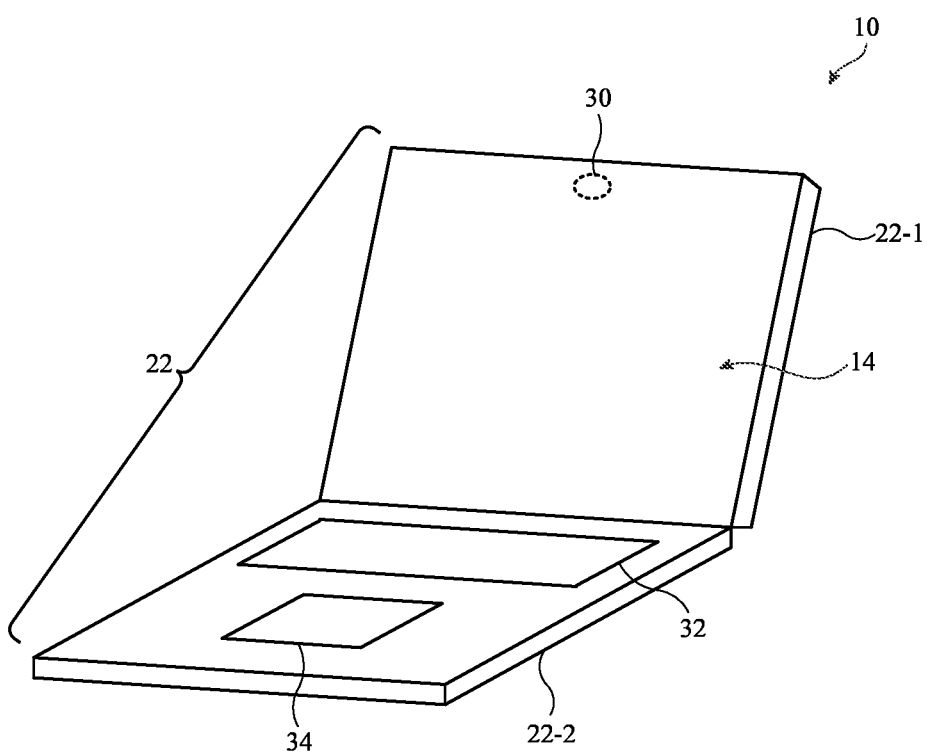

Device 10 of FIG. 2 may be a cellular telephone, tablet computer, wristwatch, or other portable device (as examples). If desired, ambient light sensors may be provided in other electronic equipment. In the example of FIG. 3, device 10 is a laptop computer. Housing 22 of device 10 of FIG. 3 includes upper housing portion 22-1 and lower housing portion 22-2, which are joined by a hinge to allow these portions to rotate with respect to each other. Display 14 may be mounted in upper housing portion 22-1. Keyboard 32 and trackpad 34 may be mounted in lower housing portion 22-2. Ambient light sensors may be mounted on housing 22 facing the exterior of device 10. As an example, an ambient light sensor module may be mounted under an active area of display 14 that is configured to display an image or an inactive area of display 14 (see, e.g., illustrative ambient light sensor region 30).

To help hide internal components in the interior of housing 22 from view, the inactive area of display 14 may be provided with an opaque masking layer. The opaque masking layer may be any suitable color (e.g., black, gray, white, a non-neutral color such as blue, etc.). In an illustrative example, display 14 has an inactive area with an opaque masking layer formed from black ink. Other opaque materials may be used, if desired.

To permit light to reach an ambient light sensor in region 30, an opening (e.g., a clear aperture, sometimes referred to as an ambient light sensor window or ambient light sensor opening) may be formed in the opaque masking layer in region 30. The shape of region 30 (e.g., the outline of the opaque masking layer opening when viewed from the exterior of device 10) may be circular, rectangular, or may have other suitable shapes. The opening may be completely free of opaque masking material (e.g., the opening may be a circular hole, etc.), thereby allowing close to 100% of ambient light to pass through the opening (e.g., at least 95% or other suitable amount of light). In the interior of device 10, an ambient light sensor module may be aligned with the ambient light sensor aperture in the opaque masking layer. To enhance the uniform appearance of the inactive area of display 14 and prevent the ambient light sensor opening from being overly noticeable to a user of device 10, the ambient light sensor module that is mounted under the opening may be provided with a light attenuator (e.g., a visible-light-absorbing structure with a light transmission of about 2-16%, at least 3%, 5-10%, 8%, at least 4%, at least 6%, less than 20%, less than 10%, or other suitable light transmission value). The dark appearance of the light attenuator in the ambient light sensor module may help absorb ambient light and reduce ambient light reflections to make the ambient light sensor module visually blend with adjacent portions of the opaque masking layer.

Figure 4:
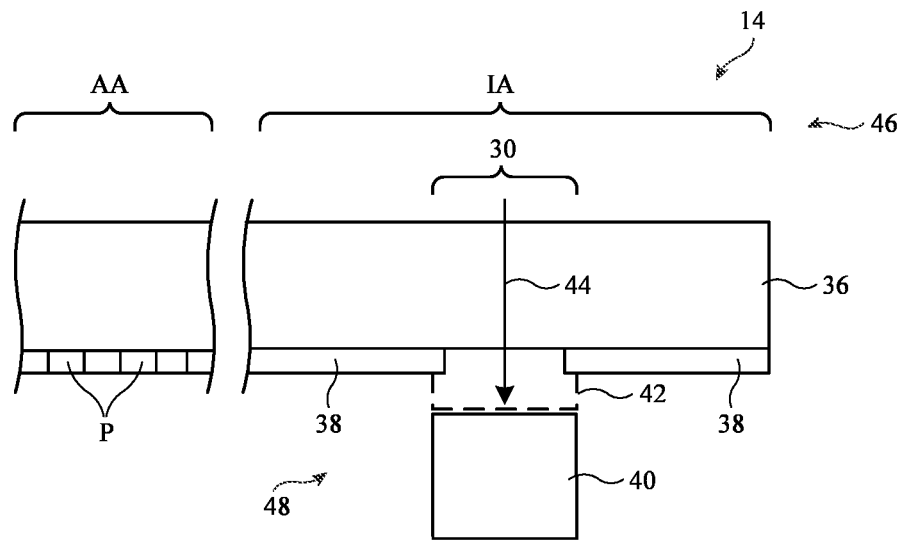
FIGS. 4 and 5 are cross-sectional side views of illustrative ambient light sensor modules under clear apertures in opaque masking layers in displays in accordance with embodiments.
Figure 5:
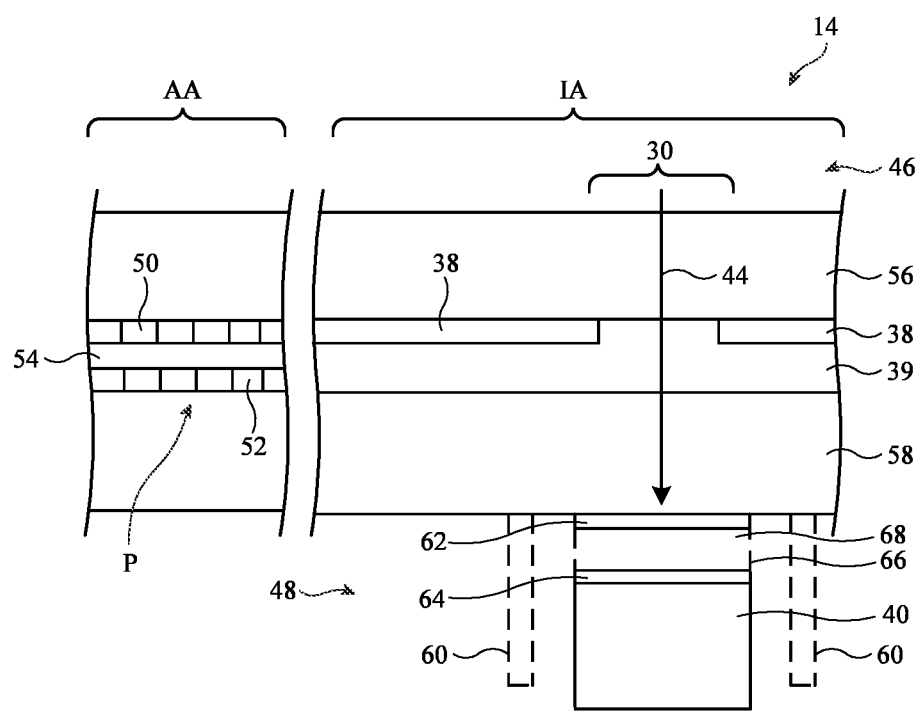

FIGS. 4 and 5 are cross-sectional side views of illustrative displays with ambient light sensors. Display 14 of FIGS. 4 and 5 has an active area AA that displays images and an inactive area IA that is covered with opaque masking material and does not display images.

In the example of FIG. 4, display 14 has a transparent display cover layer such as display cover layer 36. Display cover layer 36 may be formed from glass, polymer, sapphire or other crystalline materials, and/or other transparent materials. In active area AA, display 14 has an array of pixels P for displaying an image. Pixels P may, for example, form a light-emitting diode display panel such as a thin-film organic light-emitting diode display panel or a display panel having a pixel array formed from crystalline semiconductor light-emitting diode dies (as examples). Configurations in which display 14 is a liquid crystal display may also be used. As shown in FIG. 4, in inactive area IA of display 14, pixels P are not present. Opaque making layer 38 may be formed on the underside (inner surface) of display cover layer 36 in inactive area IA to hide internal components in interior region 48 from view from a user in the external environment (exterior region 46) surrounding device 10.

Ambient light sensor module 40 may be mounted in alignment with an opening in opaque masking layer 38 in ambient light sensor region 30. This allows ambient light sensor module 40 to receive and measure ambient light 44 that passes through display cover layer 36 and the opening in layer 38 within ambient light sensor region 30. If desired, a layer of clear adhesive such as adhesive layer 42 may be used to attach ambient light sensor module 40 to the interior of display cover layer 38 over the opening in layer 38. Other mounting arrangements may be used, if desired.

In the illustrative configuration of FIG. 5, display 14 is a liquid crystal display. In active area AA, an array of pixels P is formed from a layer of liquid crystal material 54 sandwiched between a color filter layer such as color filter layer 56 and a thin-film transistor layer such as thin-film transistor layer 58. Layers 56 and 58 may have glass substrates or other transparent supporting layers. Color filter elements 50 for the pixels of display 14 may be formed on the inner surface of the color filter layer and thin-film transistor pixel circuits 52 for the pixels of display 14 may be formed on the outer surface of the thin-film transistor layer.

In inactive area IA of display 14 of FIG. 5, opaque masking layer 38 may help block interior components in interior region 48 from view from exterior region 46. Opaque masking layer 38 may be formed on the underside of color filter layer 56 or at other locations between color filter layer 56 and thin-film transistor layer 58 (as an example). One or more transparent layers (e.g., an overcoat layer formed from polymer) such as layer 39 may be formed between layer 38 and layer 58. An ambient light sensor opening is formed in region 30 of layer 38 to permit ambient light 44 to pass through layers 56 and 58 to ambient light sensor module 40. If desired, module 40 may be surrounded by stray light blocking structures 60 (e.g., gaskets, opaque walls, etc.).

Stray light may also be reduced by coating one or more surfaces with antireflection coatings (e.g., single-layer or multi-layer dielectric thin-film stacks forming antireflection layers). In the example of FIG. 5, a first optional antireflection coating (antireflection coating 62) has been formed on the inner surface of thin-film transistor layer 58 to help suppress light reflections at the interface between layer 58 and air gap 68 and a second optional antireflection coating (antireflection coating 64) has been formed on the upper (outwardly facing) exterior surface of ambient light sensor module 40 to help suppress light reflections at the interface between air gap 68 and module 40. If desired, a layer of clear adhesive (e.g., optional adhesive 66) may be interposed between coatings 62 and 64 to help mount module 40 in alignment with the ambient light sensor opening in masking layer 38 in region 30.

Figure 6:
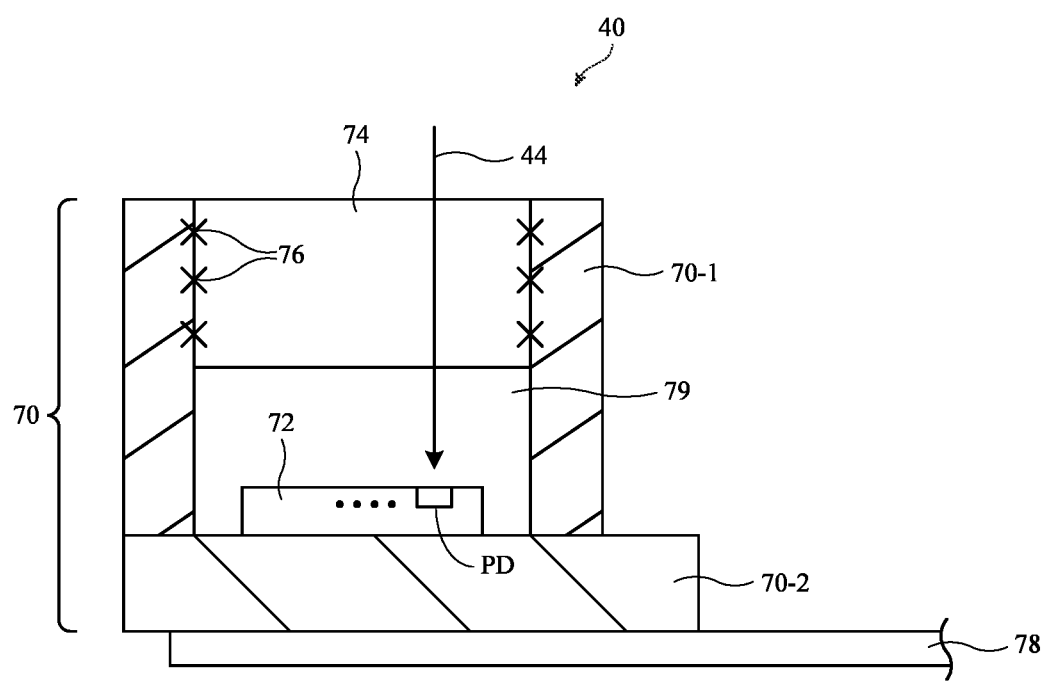
FIG. 6 is a cross-sectional side view of an illustrative ambient light sensor module coupled to a printed circuit in accordance with an embodiment.

An illustrative ambient light sensor module that includes a light attenuator is shown in the cross-sectional side view of FIG. 6. As shown in FIG. 6, ambient light sensor module 40 may have a module housing such as ambient light sensor module package 70. Package 70 may have sidewall portion 70-1 and base portion 70-2. Portions such as portions 70-1 and 70-2 may be formed from opaque polymer (e.g., black polymer), ceramic, and/or other materials. Portion 70-2 may contain signal lines formed from metal traces. The metal traces may include contacts such as solder pads that are soldered or otherwise electrically connected to corresponding contacts in ambient light sensor semiconductor die 72. Die 72 contains circuitry such as photodetectors PD (e.g., photodiodes) and/or other circuitry for gathering ambient light measurements. Light filters configured to pass desired wavelengths (e.g., bands of wavelengths of different associated colors in a color ambient light sensor) and/or to optionally block infrared light may overlap the photodetectors on die 72 (and/or may be formed as part of optical structure 74). There may be any suitable number of photodetectors PD on die 72 (e.g., at least 3, at least 6, at least 10, fewer than 25, fewer than 12, fewer than 9, 1, 2, etc.). The metal traces in portion 70-2 may, if desired, form through-hole vias that are electrically connected to contacts on the lower surface of portion 70-2. Optional additional signal paths (e.g., signal paths in printed circuit 78 or other signal lines) may be connected to the downwardly facing contacts on the lower surface of portion 70-2. If desired, portion 70-2 may have an integral tail (e.g. a flexible printed circuit tail) that is used in connecting to other printed circuits in device 10 and/or may have a board-to-board connector or other connector structure for interconnecting the photodiodes and other circuitry of the ambient light sensor formed from die 72 to control circuitry 16 and/or other circuitry in device 10. The electrical interconnection arrangement of FIG. 6 is illustrative.

To provide module 40 with desired optical properties, such as desired amounts of visible light transmission, desired amounts of optional infrared-light blocking, desired amounts of light diffusion (e.g., to avoid angular dependence in ambient light readings that might otherwise arise when using device 10 in an environment with one or more specular light sources), desired amounts of light guiding, and/or other desired optical proprieties, optical module 40 may be provided with one or more stacked optical layers, transparent polymer or glass members, and/or other optical structures such as optical structure 74. Structure 74, which may sometimes be referred to as an optical module window structure or optical module cover, may exhibit sufficient transparency to allow a fraction of ambient light 44 to pass to ambient light sensor die 72 so that module 40 may be used in making ambient light intensity and/or color measurements. Structure 74 may be attached to package portion 70-1 using attachment structures 76 (e.g., adhesive, interlocking engagement structures such as clips, fasteners such as screws, press-fit connections, ledges and other structures that help align and support structure 74, etc.). An air gap such as optional air gap 79 may be present between the lower (inwardly facing) surface of structure 74 and the opposing upper (outwardly facing) surface of die 72 (and/or a filter layer and/or other structures on the surface of die 72) or air gap 79 of FIG. 6 may be partly or fully filled with clear adhesive (as examples). Adhesive layers may, in general, be interposed between any adjacent optical layers (e.g., between structure 74 and a display cover layer, color filter layer, thin-film transistor layer, or other transparent layer of glass or other material in display 14, between layers of material in structure 74, between the lower surface of structure 74 and die 72, etc.). If desired, one or more of these adhesive layers (e.g., clear polymer layers) may be index matched to surrounding layers.

Structure 74 may include structures that perform functions such as visible light attenuation (e.g., some or all of structure 74 may serve as a light attenuator), light diffusion (e.g., some or all of structure 74 may exhibit haze the helps to diffuse ambient light 44 as light 44 passes to ambient light sensor die 72), light filtering (e.g., to block infrared light and/or to pass a desired amount of visible light of one or more desired colors), and/or light guiding (e.g., to form a waveguide that confines light laterally while transporting light towards die 72 from the opening in masking layer 38). If desired, some or all of these functions may be performed by a layer that serves multiple functions. For example, a dark layer of material with light-scattering structures may serve as both a light attenuator and a diffuser. As another example, a thin-film interference filter may serve both as a light attenuator (passing a desired amount of visible ambient light) and an infrared-light-blocking filter.

Illustrative structures of the type that may be incorporated into structure 74 of module 30 are shown in FIGS. 7, 8, 9, and 10.

Figure 7:
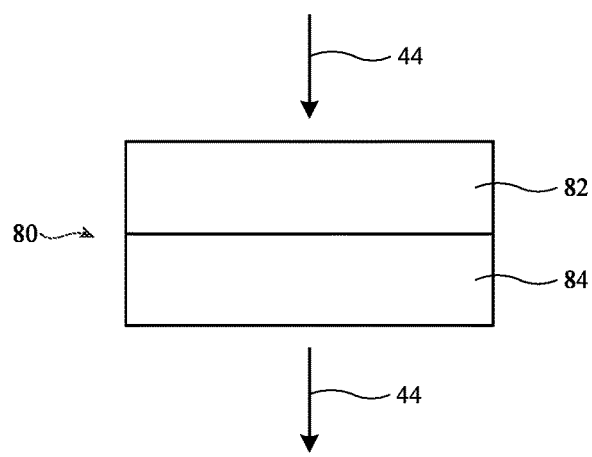
FIG. 7 is a cross-sectional side view of an illustrative light attenuator for an ambient light sensor module in accordance with an embodiment.

An illustrative light attenuator is shown in FIG. 7. As shown in FIG. 7, light attenuator 80 may have one or more layers such as layers 82 and 84. Layer 84 may be, for example a substrate layer formed from a layer of polymer, glass, or other transparent material. The thickness of layer 84 may be, for example, at least 25 microns, at least 250 microns, at least 1 mm, less than 3 mm, less than 1.5 mm, or less than 750 microns (as examples). Layer 82 may be a coating layer (e.g., a coating with a thickness at least 1%, at least 10%, 20-100%, less than 50%, less than 30%, or other suitable fraction of the thickness of layer 84). A coating such as layer 82 may be, for example, a polymer coating layer that is applied to substrate layer 84 as a liquid and subsequently cured. Layers such as layer 82 may be formed on the upper and/or lower surfaces of substrate layer 84. To perform light absorbing functions, layer 82 and/or layer 84 may be provided with light-absorbing material such as dye, pigment, and/or other colorant that is provided as an additive in the polymer, glass, or other material forming layer 82 and/or layer 84 and that causes layer 82 and/or layer 84 to absorb desired amounts of visible light, infrared light, and/or ultraviolet light). As an example, layer 82 and/or layer 84 may be provided with a black additive such as a carbon-based pigment, black dye, etc. that causes layer 82 and/or layer 84 to absorb visible light and thereby provide attenuator 80 with a desired amount of light transmission. If desired, substrate layer 84 may be omitted (e.g., in a configuration in which coating layer 82 is supported on another layer in structure 74 and/or in which light-absorbing material is formed in another portion of structure 74) and/or coating 82 may be omitted (e.g., in a configuration in which layer 84 serves as an uncoated light attenuator).

Figure 8:
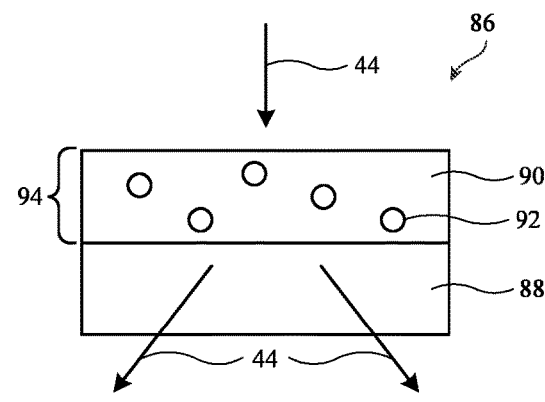
FIG. 8 is a cross-sectional side view of an illustrative light diffuser for an ambient light sensor module in accordance with an embodiment.

An illustrative light diffuser for structure 74 is shown in FIG. 8. As shown in FIG. 8, light diffuser 86 may have one or more layers such as layers 94 and 88. Layer 88 may be, for example, a substrate layer formed from glass or polymer (as examples). The thickness of substrate layer 88 may be, for example, at least 25 microns, at least 250 microns, at least 1 mm, less than 3 mm, less than 1.5 mm, or less than 750 microns (as examples). Layer 94 may be a coating layer (e.g., a coating with a thickness at least 1%, at least 10%, 20-100%, less than 50%, less than 30%, or other suitable fraction of the thickness of layer 88) or layer 94 may be a substrate layer (e.g., in a configuration in which layer 88 is omitted). One or both of layers 88 and 94 may be provided with light-scattering structures (e.g., surface texture, embedded light-scattering structures such as light-scattering particles, etc.). In the example of FIG. 8, layer 94 includes light-scattering structures (e.g., particles) 92 embedded in polymer binder 90. Structures 92 may have a refractive index that differs from the refractive index of the polymer of binder 90 so that ambient light 44 is scattered when passing through diffuser 86 (e.g., diffuser 86 exhibits haze of at least 10%, at least 40%, less than 100%, or other suitable haze value). Structures 92 may be inorganic light-scattering particles such as particles of oxides such as silica, alumina, titanium oxide, etc. or other particles with refractive index values that differ from binder 90 and/or light-scattering structures 92 may be formed from gas bubble or voids embedded in binder 90 (as examples). If desired, light-absorbing material (e.g., a colorant such as a dark dye and/or dark pigment) may be added to binder 90 and/or substrate layer 88 to provide light diffuser 86 with light absorbing properties (e.g., so that diffuser 86 can serve as both a light attenuator and a light diffuser). In some configurations, some or all of structures 92 may be dark particles (e.g., carbon particles or other particles that scatter and absorb light). Arrangements in which coating 94 is omitted (e.g., configurations in which light-scattering structures are formed only in substrate 88) and/or arrangements in which coating 94 is supported by other structures in structure 74 (e.g., a filter layer, waveguide, attenuator substrate, etc.) may be used, if desired.

Figure 9:
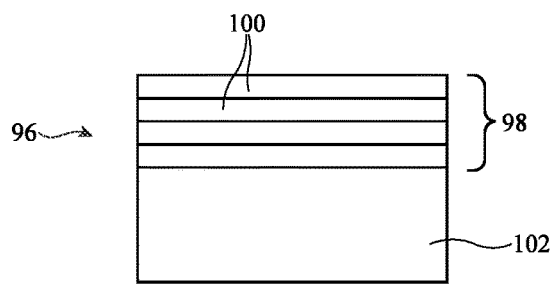
FIG. 9 is a cross-sectional side view of an illustrative thin-film interference filter for blocking visible and/or infrared light for an ambient light sensor module in accordance with an embodiment.

FIG. 9 is a cross-sectional side view of an illustrative light filter structure that may be used in forming structure 74. In the example of FIG. 9, light filter 96 includes a dielectric stack such as layer 98 and substrate layer 102. The thickness of substrate layer 102 may be, for example, at least 25 microns, at least 250 microns, at least 1 mm, less than 3 mm, less than 1.5 mm, or less than 750 microns (as examples). Layer 98 may be a thin-film interference filter formed from a stack of thin-film dielectric layers 100 (e.g., a coating with a thickness at least 1%, at least 10%, 20-100%, less than 50%, less than 30%, or other suitable fraction of the thickness of layer 102). Layers 100 may be thin-film dielectric layers formed from inorganic layers (e.g., layers deposited by physical vapor deposition, as an example) and/or polymer layers. The refractive index values of layers 100 may alternate and/or may have other appropriate thicknesses and refractive index values to form a thin-film interference filter that blocks infrared light and/or configures filter 96 to attenuate visible light by a desired amount (e.g., filter 96 may be an infrared-light-blocking-and-visible-light-transmitting filter and may have a visible light transmission of at least 1%, at least 5%, at least 10%, at least 90%, 100%, less than 50%, less than 10%, or other suitable value). In this way, filter 96 may serve as an infrared-light-blocking filter (sometimes referred to as an infrared filter) and/or a light attenuator that helps match the darkness of the ambient light sensor window to the darkness of surrounding portions of opaque masking layer 38.

Figure 10:
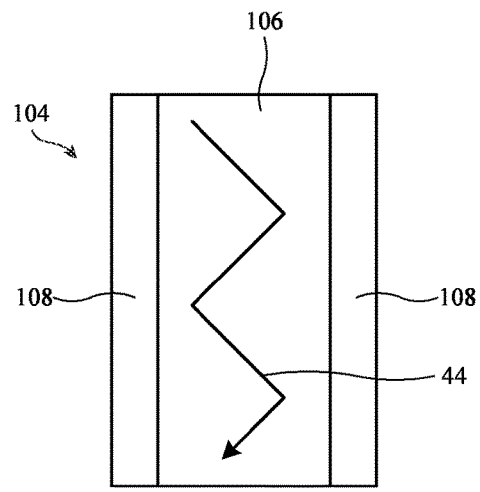
FIG. 10 is an illustrative optical waveguide for an ambient light sensor module in accordance with an embodiment.

FIG. 10 is a cross-sectional side view of an illustrative light-guide structure that may be used in forming structure 74. Optical waveguide 104 of FIG. 10 may have a transparent optical waveguide (light guide) core such as core 106 (e.g., glass, polymer, or other transparent dielectric) surrounded by material 108. Material 108 may, as an example, be a transparent material such as polymer, glass, or other dielectric having a lower refractive index than the refractive index of material 106 so that material 108 promotes total internal reflection of ambient light 44, thereby allowing light 44 to be confined to core 106 and guided along the length of waveguide 104. If desired, material 108 may be formed from reflective materials such as metal or may include metal to help with light confinement. Materials 106 and/or 108 may be formed from dielectric such as clear polymer or glass and may include light-absorbing material (e.g., dye, pigment and/or other additives).

Structures of the types shown in FIGS. 7, 8, 9, and/or 10 may be used individually and/or in any combination to form structure 74 of FIG. 6. For example, waveguide 104 of FIG. 10 may be used with one or more of the structures of FIGS. 7, 8, and/or 9 or the structures of FIGS. 7, 8, and/or 9 can be used without a waveguide. The structures of FIGS. 7 and 8 may be combined with or without using the structures of FIG. 9, the structure of FIGS. 7 and 9 may be used with or without using the structures of FIG. 8, and/or the structures of FIGS. 8 and 9 may be used with or without using the structures of FIG. 7 (as examples).

FIGS. 11, 12, 13, 14, 15, and 16 are cross-sectional side views of illustrative arrangements for forming all or part of structure 74 of FIG. 6.

Figure 11:
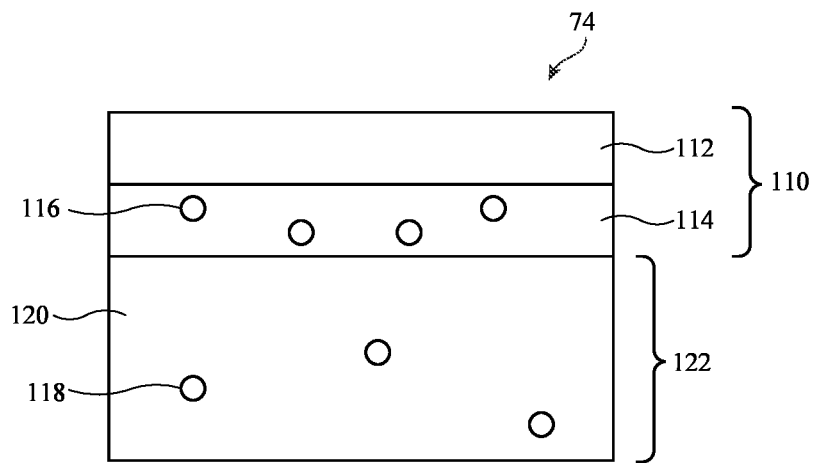
FIGS. 11, 12, 13, 14, 15, and 16 are cross-sectional side views of illustrative optical layers for ambient light sensor modules in accordance with embodiments.

In the example of FIG. 11, structure 74 includes a dark diffuser. Dark diffuser 110 may have a clear or dark substrate layer such as substrate layer 112 (e.g., a layer of polymer film or glass substrate) and may have a polymer coating formed by polymer 114 with embedded light-scattering structures 116. Light-absorbing material (e.g., dye, pigment, or other colorant) in layer 112 and/or layer 114 may be configured to provide dark diffuser 110 with a desired amount of light attenuation. For example, light-scattering structures 116 may be formed from carbon-based particles (e.g., black pigment particles that absorb light while scattering light) and/or white and/or dark light-scattering structures 116 may be embedded in polymer that contains black dye. In this way, dark diffuser 110 may serve both as a light diffuser and as a light attenuator. Dark diffuser 110 may be attached to optional volume diffuser 122 (e.g., a molded polymer member such as a layer of polymer 120 in which light-scattering structures 118 have been embedded). Diffuser 122 may be thicker than diffuser 110 (as an example).

Figure 12:
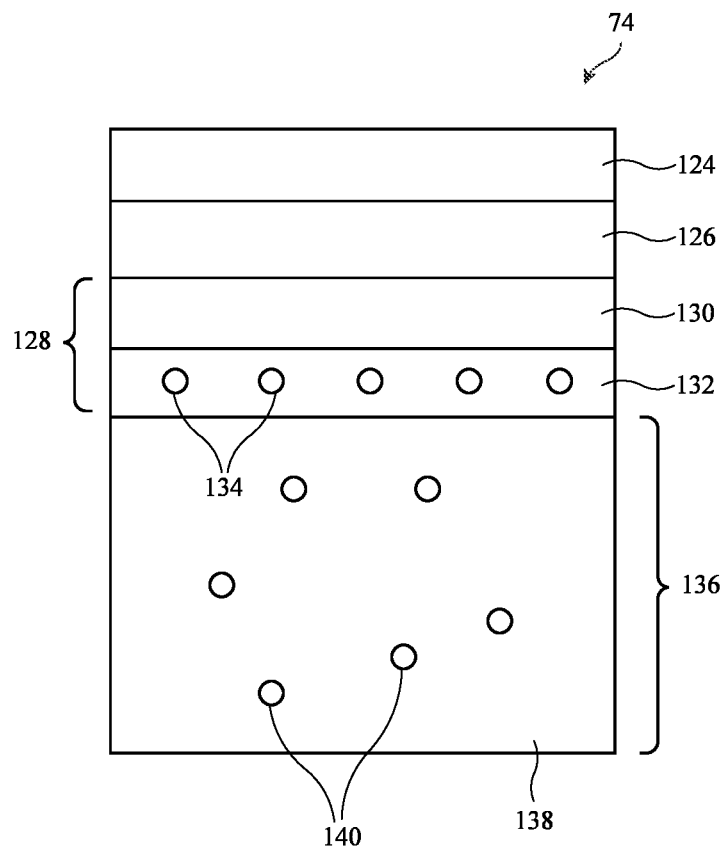

In the example of FIG. 12, structure 74 includes a dark layer such as dark layer 124 for providing a desired amount of light attenuation. Dark layer 124 may be a layer of glass or polymer with light-absorbing material (e.g., dye and/or pigment) that absorbs light so that dark layer 124 can serve as a light attenuator. Adhesive layer 126 may be used to attach layer 124 to diffuser 128.

Diffuser 128 may be formed from polymer (or glass) substrate layer 130 coated with a layer of polymer such as polymer coating layer 132 in which light-scattering structures (e.g., particles) 134 have been embedded. Volume diffuser 136 may be formed from molded polymer or other clear material (e.g., polymer layer 138) in which light-scattering structures 140 (e.g. particles) have been embedded. The thickness of diffuser 136 may be greater than that of diffuser 128 (as an example). The thickness of volume diffusers such as diffuser 136 of FIG. 12 and diffuser 122 of FIG. 11 may be, for example, at least 0.1 mm, at least 0.5 mm, at least 1 mm, less than 3 mm, less than 2 mm, less than 0.8 mm, less than 0.4 mm, or other suitable thickness. If desired, diffusers 122 and 136 may be omitted.

Figure 13:
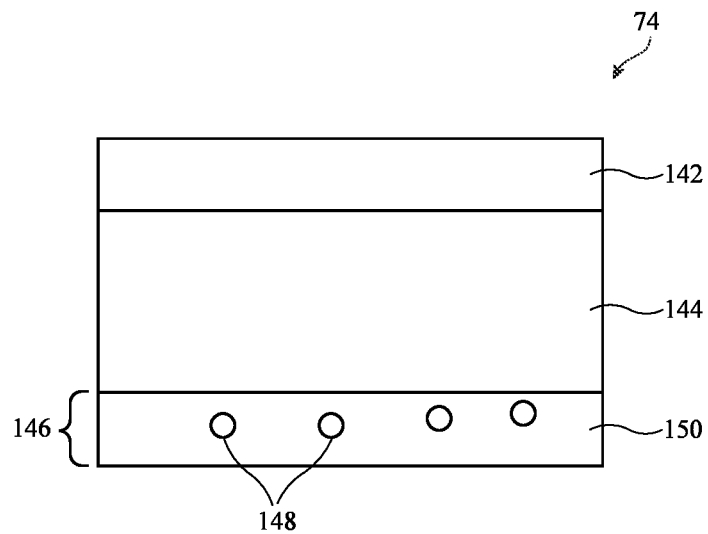

In the example of FIG. 13, structure 74 has a light-absorbing layer such as light-absorbing layer 142. Layer 142 may be a dark substrate layer or may be a black ink coating or other dark coating (e.g., a light-absorbing polymer) formed on a clear or dark substrate such as substrate layer 144 formed from polymer or glass. Diffuser layer 146 may be a coating formed from polymer 150 on the lower surface of substrate layer 144. Light-scattering structures 148 may be embedded in polymer 150.

Figure 14:
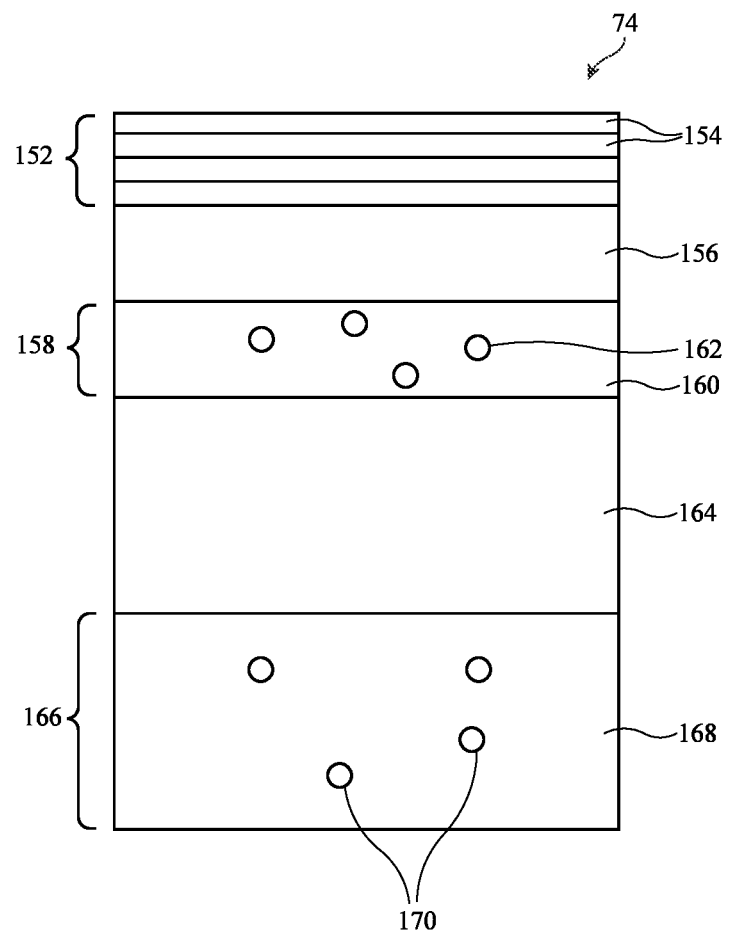

Another illustrative set of layers that may be used to form all or part of structure 74 is shown in FIG. 14. In the example of FIG. 14, thin-film interference filter 152 (e.g., a visible-light attenuating filter and/or an infrared-light-blocking filter) may be formed from a stack of dielectric layers 154 on substrate layer 156 (e.g., a polymer or glass substrate). Diffuser 158 may be formed from a polymer coating (polymer layer 160) on the lower surface of substrate 156. Light-scattering structures 162 may be embedded within polymer layer 160. Optional waveguide 164 (see, e.g., waveguide 104 of FIG. 10) may be interposed between layer 158 and layer 166 (as an example). Layer 166 may be a dark volume diffuser formed from molded polymer (layer 168) with embedded light-scattering structures. Light-absorbing material such as dye and/or pigment may be provided in layer 166 so that layer 166 serves as a light attenuator in addition to a light diffuser.

Figure 15:
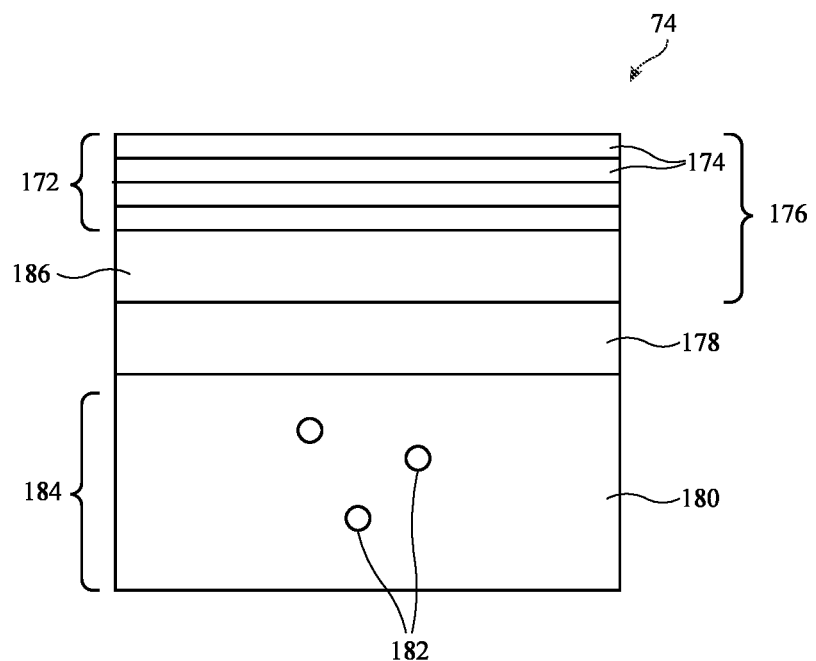
Figure 16:
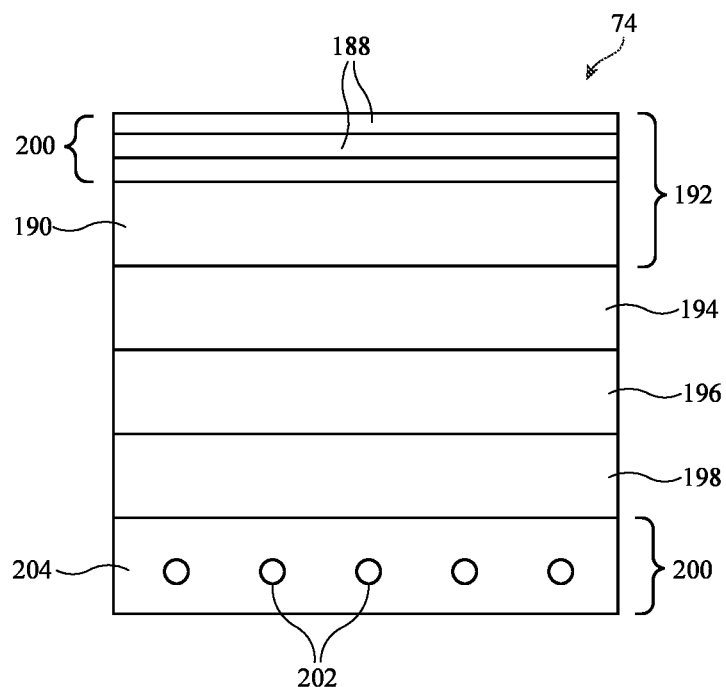

If desired, an infrared blocking filter may be included in structure 74 as shown in the examples of FIGS. 15 and 16. In the example of FIG. 15, infrared-light-blocking filter 176 has been formed from a thin-film interference filter such as filter 172 with a stack of dielectric layers 174 configured to pass visible light while blocking infrared light. Filter 172 may be formed as a thin-film coating on substrate 186 (e.g., a substrate formed from a glass or polymer layer). Optional adhesive layer 178 may be used to attach substrate 186 to volume diffuser 184. Diffuser 184 may be formed from molded polymer 180 with embedded light-scattering structures 182. Diffuser 184 may be a dark diffuser that is configured to attenuate visible light (e.g., diffuser 184 may include additives such as dye, pigment, and/or other colorant to absorb visible light). In this way, diffuser 184 may serve both as a light diffuser and as a light attenuator.

In the illustrative configuration of FIG. 16, infrared-light-blocking filter 192 is formed from a thin-film interference filter such as filter 200 that has a stack of dielectric layers 188 on substrate layer 190. Layer 190 may be formed from clear polymer or glass. Layers 188 may be configured so that filter 192 passes visible light while blocking infrared light. If desired, filter 200 may be configured to attenuate visible light (e.g., so that filter 192 may optionally serve as a light attenuator). Adhesive layer 194 may be used to attach substrate layer 190 to underlying structures such as light-absorbing layer 196. Light-absorbing layer 196 may be a layer of dark ink (e.g., black polymer), a thin-film interference filter layer, or other layer that forms a light attenuator. Layer 196 may be formed as a coating on substrate layer 198 (e.g., a layer of glass or polymer). Light diffuser layer 200 may be formed from a polymer coating on substrate layer 198 (polymer 204) into which light-scattering structures (e.g., particles) 202 have been embedded.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

| Table of Reference Numerals | | | |
|---|---|---|---|
| 10 | Electronic Device | 12 | Input-Output Devices |
| 14 | Display | 16 | Control Circuitry |
| 18 | Sensors | 30 | Ambient light sensor region |
| 22 | Housing | 26 | Pixels |
| F | Front face | 28 | Components |
| 22-1 and 22-2 | Housing portions | 32 | Keyboard |
| 34 | Trackpad | AA | Active area |
| IA | Inactive area | 44 | Ambient light |
| 36 | Display cover layer | 38 | Opaque masking layer |
| P | Pixels | 14P | Display panel |
| 48 | Interior region | 46 | Exterior region |
| 42 | Adhesive layer | 40 | Ambient light sensor module |
| 50 | Color filter elements | 52 | Pixel circuits |
| 54 | Liquid crystal layer | 56 | Color filter layer |
| 58 | Thin-film transistor layer | 60 | Stray light blocking structures |
| 62, 64 | Antireflection coatings | 66 | Adhesive |
| 70 | Package | 70-1,70-2 | Package portions |
| 76 | Attachment structures | 72 | Ambient light sensor die |
| PD | Photodetectors | 78 | Printed circuit |
| 79 | Air gap | 74 | Structure |
| 80 | Light attenuator | 82, 84 | Layers |
| 86 | Light diffuser | 94, 88 | Layers |
| 90 | Polymer | 92 | Light-scattering structures |
| 96 | Filter | 100 | Dielectric layers |
| 98 | Layer | 102 | Substrate layer |
| 104 | Waveguide | 106 | Core |
| 108 | Material | 112 | Layer |
| 114 | Polymer | 116 | Light-scattering structures |
| 110 | Dark diffuser | 124 | Dark layer |
| 126 | Adhesive | 128 | Diffuser |
| 130 | Substrate layer | 132 | Polymer |
| 134 | Light-scattering structures | 136 | Volume diffuser |
| 138 | Polymer | 140 | Light-scattering structures |
| 142 | Light-absorbing layer | 144 | Substrate layer |
| 146 | Diffuser layer | 150 | Polymer |
| 148 | Light-scattering structures | 152 | Thin-film interference filter |
| 154 | Layers | 156 | Substrate layer |
| 158 | Diffuser layer | 160 | Polymer |
| 162 | Light-scattering structures | 164 | Waveguide |
| 166 | Dark diffuser | 168 | Polymer |
| 170 | Light-scattering structures | 174 | Layers |
| 172 | Filter | 174 | Layers |
| 176 | Infrared-light-blocking filter | 186 | Substrate layer |
| 178 | Adhesive | 184 | Volume diffuser |
| 180 | Polymer | 182 | Light-scattering structures |
| 200 | Filter | 188 | Layers |
| 192 | Infrared-light-blocking filter | 190 | Substrate layer |
| 194 | Adhesive | 196 | Light-absorbing layer |
| 198 | Substrate layer | 200 | Diffuser layer |
| 204 | Polymer | 202 | Light-scattering structures |

What is claimed is:

1. An ambient light sensor module, comprising:
   an ambient light sensor package;
   an ambient light sensor semiconductor die mounted in the ambient light sensor package; and a visible-light-absorbing layer mounted in the ambient light sensor package, wherein the visible-light-absorbing layer comprises a diffuser that includes light-scattering structures and that is configured to absorb visible light.

2. The ambient light sensor module defined in claim 1, wherein the visible-light-absorbing layer is configured to exhibit a visible light transmission of 2-16%.

3. The ambient light sensor module defined in claim 2, wherein the visible-light-absorbing layer comprises a dark layer of ink.

4. The ambient light sensor module defined in claim 1, wherein the ambient light sensor package comprises opaque sidewalls.

5. The ambient light sensor module defined in claim 1, wherein the visible-light-absorbing layer comprises a filter layer.

6. The ambient light sensor module defined in claim 5, wherein the filter layer comprises a thin-film interference filter that includes a stack of dielectric layers.

7. An ambient light sensor module, comprising:
an ambient light sensor semiconductor die;
a package in which the ambient light sensor semiconductor die is mounted;
a light attenuator mounted in the package, wherein the light attenuator is configured to attenuate ambient light before the ambient light reaches the ambient light sensor semiconductor die; and
a waveguide that comprises a core surrounded by cladding, wherein the waveguide is configured to guide incident light to the ambient light sensor semiconductor die.

8. The ambient light sensor module defined in claim 7, wherein the light attenuator comprises a substrate and a layer of light-absorbing ink on the substrate.

9. The ambient light sensor module defined in claim 7, wherein the light attenuator comprises a dark diffuser formed from a light-absorbing polymer with light-scattering structures.

10. The ambient light sensor module defined in claim 9, wherein the light-scattering structures comprise black particles that absorb light.

11. The ambient light sensor module defined in claim 9, wherein the light-absorbing polymer comprises black colorant.

12. The ambient light sensor module defined in claim 7, wherein the light attenuator comprises a thin-film interference filter having a stack of dielectric layers configured to attenuate visible light.

13. The ambient light sensor module defined in claim 12, wherein the stack of dielectric layers is configured to block infrared light.

14. The ambient light sensor module defined in claim 7, further comprising an infrared-light-blocking filter mounted in the package.

15. The ambient light sensor module defined in claim 7, further comprising a light diffuser mounted in the package.

16. An ambient light sensor module configured to generate ambient light sensor measurements in response to ambient light, comprising:
an ambient light sensor package;
at least one photodetector in the ambient light sensor package, wherein the at least one photodetector is configured to generate the ambient light sensor measurements; and
a light attenuator mounted in the package that is configured to attenuate the ambient light before the ambient light is provided to the at least one photodetector, wherein the light attenuator comprises a visible light-absorbing layer.

17. The ambient light sensor module defined in claim 16, wherein the light attenuator is configured to exhibit a visible light transmission of less than 20%.

18. The ambient light sensor module defined in claim 17 wherein the light attenuator comprises a diffuser that includes light-scattering structures embedded in the visible light-absorbing layer.

* * * * *